US008246827B2

(12) United States Patent
Chen et al.

(10) Patent No.: US 8,246,827 B2
(45) Date of Patent: Aug. 21, 2012

(54) HOLLOW-FIBER MEMBRANE ASSEMBLY HAVING THE FUNCTION OF PREVENTING THE MEMBRANE FILAMENTS FROM CRACKING

(75) Inventors: Lianggang Chen, Suzhou (CN); Man Chen, Suzhou (CN); Qing Chen, Suzhou (CN)

(73) Assignee: Suzhou Litree Purifying Technology Co. Ltd., Suzhou, Jiangsu (CN)

( * ) Notice: Subject to any disclaimer, the term of this patent is extended or adjusted under 35 U.S.C. 154(b) by 253 days.

(21) Appl. No.: 12/670,093

(22) PCT Filed: May 15, 2008

(86) PCT No.: PCT/CN2008/070965
§ 371 (c)(1),
(2), (4) Date: Jan. 21, 2010

(87) PCT Pub. No.: WO2009/015566
PCT Pub. Date: Feb. 5, 2009

(65) Prior Publication Data
US 2010/0206805 A1     Aug. 19, 2010

(30) Foreign Application Priority Data

Jul. 27, 2007   (CN) ...................... 2007 2 0072974 U

(51) Int. Cl.
*B01D 63/00* (2006.01)
*B01D 33/21* (2006.01)
*B01D 39/00* (2006.01)
*C02F 1/44* (2006.01)

(52) U.S. Cl. ........... 210/321.8; 210/321.89; 210/321.87; 210/321.6; 210/500.23

(58) Field of Classification Search ............... 210/321.6, 210/321.78–321.89, 500.23; 264/DIG. 48
See application file for complete search history.

(56) References Cited

U.S. PATENT DOCUMENTS

| 4,666,543 | A | * | 5/1987 | Kawano ........................ 156/169 |
| 4,966,699 | A | * | 10/1990 | Sasaki et al. ............... 210/321.8 |
| 5,470,469 | A | * | 11/1995 | Eckman .................... 210/321.8 |
| 6,478,961 | B2 | | 11/2002 | Petty et al. |
| 7,344,645 | B2 | * | 3/2008 | Beck et al. .................... 210/650 |
| 8,069,990 | B2 | * | 12/2011 | Grangeon et al. ............ 210/450 |

FOREIGN PATENT DOCUMENTS

| CN | 1853763 A | 11/2006 |
| CN | 1962038 A | 5/2007 |

OTHER PUBLICATIONS

International Search Report of PCT/CN2008/070965, dated Aug. 21, 2008.

* cited by examiner

*Primary Examiner* — Ana Fortuna
(74) *Attorney, Agent, or Firm* — Hamre, Schumann, Mueller & Larson, P.C.

(57) ABSTRACT

A hollow-fiber membrane assembly having the function of preventing the membrane filaments from cracking, which comprises: hollow-fiber membrane filaments (1), protective film(s) (2) and fastening material (3), wherein the protective film (2) enwraps the outside of the hollow-fiber membrane filament(s) (1) near the end head (5), and a portion of the protective film (2) is immobilized in the fastening material (3), while the rest portion of the protective film (2) outside of the fastening material (3) is left free.

9 Claims, 4 Drawing Sheets

HOLLOW-FIBER MEMBRANE ASSEMBLY HAVING THE FUNCTION OF PREVENTING THE MEMBRANE FILAMENTS FROM CRACKING

This Application is a 371 of PCT/CN08/70965 filed on May 15, 2008, which claims priority of application CHINA 200720072974.6 filed on Jul. 27, 2007.

TECHNICAL FIELD

The invention relates to a filtering equipment, in particular to a hollow-fiber membrane assembly capable of preventing hollow-fiber membrane filaments from cracking. The invention also relates to a filter comprising the hollow-fiber membrane assembly capable of preventing hollow-fiber membrane filaments from cracking.

BACKGROUND ART

Hollow-fiber membranes have been widely used in water treatment, biological separation, air filtration and the like. A typical way of constructing a hollow-fiber membrane assembly involves providing a bundle of hollow-fiber membranes in a pressure bearing shell and then immobilizing the end head(s) of the bundle, or immobilizing the ends of the membrane filaments directly in the end head(s). The direct containment of a bundle of membranes in a shell and the direct immobilization of the ends of the membrane filaments in the end head(s) tend to result in knotting and fouling-up of the fiber membranes, a small throughput of the outcoming water, and a short life of the membrane assembly.

One or both ends of a hollow-fiber membrane filament are immobilized in the end head(s) of a membrane assembly in order to package the membrane filament into the membrane assembly. The joint between the hollow-fiber membrane filament and the fastening material tends to break during the operation of the membrane assembly. To avoid this problem, a practice once utilized is the filling of soft gum into the joint to prevent it from cracking. However, the soft gum tends to scale off, causing the joint between the hollow-fiber membrane filament and the fastening material cracking wholly.

Thus, the directly immobilized membrane assembly has been modified by various methods, wherein the membrane bundle is covered with a reticular protective layer according to one method, or the membranes are divided into several bundles using partition plates according to another one. Despite some protection they provide for the membranes, these methods still tend to impair the membrane bundle, break the membrane filaments, and suffer from low filtration efficiency, with the problems of water stream distribution and produced-water collection left unsolved. In particular, the problems are more serious when the diameter and the length of the membrane assembly are relatively large.

So far, a hollow-fiber membrane assembly capable of preventing the joint between the hollow-fiber membrane filament and the fastening material from cracking has not yet been available in this field.

Thus, a hollow-fiber membrane assembly capable of preventing the joint between the hollow-fiber membrane filament and the fastening material from cracking is in urgent need in this field.

SUMMARY OF THE INVENTION

The invention provides a novel hollow-fiber membrane assembly which is effective in preventing the joint between the hollow-fiber membrane filament and the fastening material from cracking, so that the existing problems in the field are solved.

In one aspect of the invention, there is provided a hollow-fiber membrane assembly capable of preventing hollow-fiber membrane filaments from cracking, comprising hollow-fiber membrane filaments, protective film(s) and fastening material, wherein the protective film enwraps the outside of the hollow-fiber membrane filament(s) near the end head, and a portion of the protective film is immobilized in the fastening material, while the rest portion of the protective film outside of the fastening material is left free.

In one preferred embodiment, the protective film sheathes the outside of the hollow-fiber membrane filament(s), and one protective film sheath contains one or more hollow-fiber membrane filaments.

In another preferred embodiment, the inner surface of the protective film sheath is in close contact with the outer surface of the hollow-fiber membrane filament(s), wherein the free end opening of the protective film sheath left outside of the fastening material has a bell-mouthed shape.

In another preferred embodiment, the section of the protective film sheath has a shape selected from the group consisting of one circle, one triangle, one ellipse, one quadrangle, or any other polygon alone, and more circles, triangles, ellipses, quadrangles, or other polygons in combination.

In another preferred embodiment, the hollow-fiber membrane filaments in the protective film sheath are formed into a membrane bundle, wherein the end of the membrane bundle is immobilized in the fastening material at the end head, and the inner stream passage of the hollow-fiber membrane filament is open at least at one end to allow water in or out.

In another preferred embodiment, when the ends of more than one membrane bundles are immobilized in the fastening material at the end head, the membrane bundles are interconnected, wherein the void formed at the joint has a shape selected from the group consisting of a circle, an ellipse, a triangle and other polygons, and the void formed at the joint is hollow or plugged up with the fastening material.

In another preferred embodiment, the protective film is made up of material selected from plastics, plastic cements and non-woven cloth, the Shore hardness number of which is 1-90.

In another preferred embodiment, the protective film is made up of material selected from silica gel, polyvinyl chloride, neoprene, polyethylene, polystyrene, elastic plastics, EPDM rubber and polyurethane.

In another preferred embodiment, there is no void between the protective film and the hollow-fiber membrane filaments, wherein the upper part of the end head of the hollow-fiber membrane filaments and the upper part of the protective film are immobilized in the fastening material, and the hollow-fiber membrane filaments immobilized in the fastening material are separated from one another by the fastening material.

In another aspect of the invention, there is provided a filter comprising the foregoing hollow-fiber membrane assembly capable of preventing hollow-fiber membrane filaments from cracking.

DETAILED DESCRIPTION OF THE INVENTION

Figure 1:
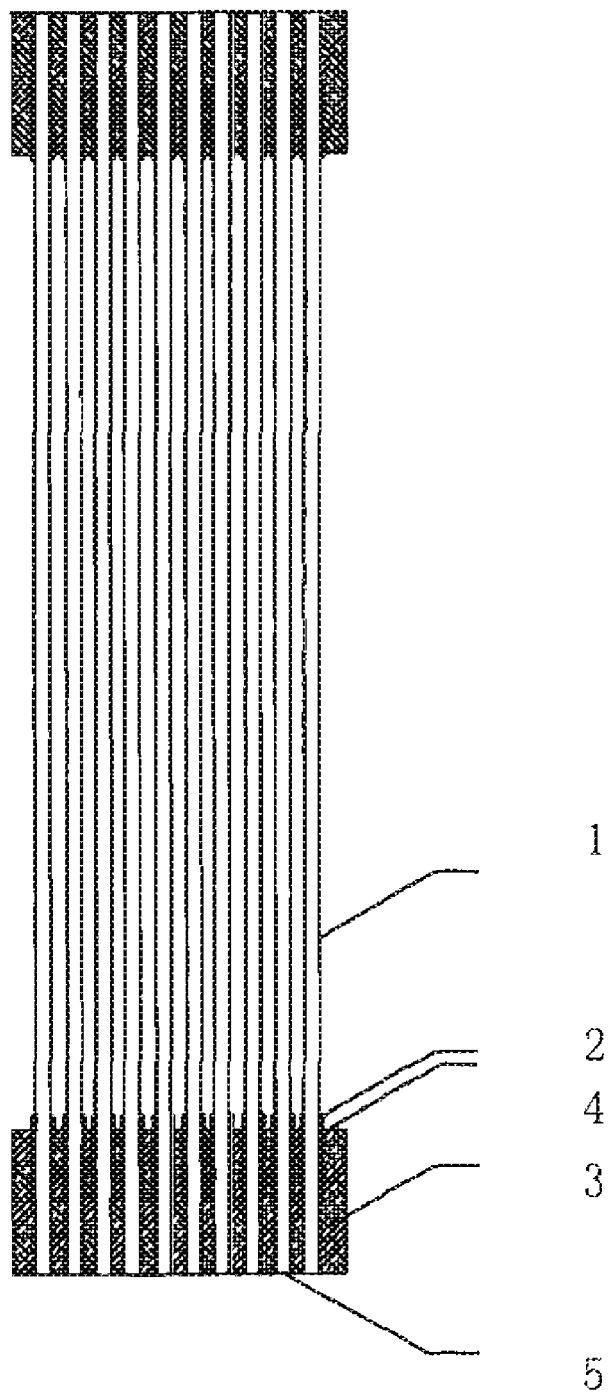
FIG. 1 is a sectional view of hollow-fiber membrane filaments enlaced by protective films and then immobilized in fastening material according to one embodiment of the invention.

After extensive and intensive research, the inventors have found that break of the joint between the hollow-fiber membrane filaments and the fastening material can be avoided completely by enlacing or sheathing the outside of the hollow-fiber membrane filaments with protective films so as to enhance the tensile strength of the hollow-fiber membrane filaments to a great extent. Based on the foregoing findings, this invention has been made.

In one aspect of the invention, there is provided a hollow-fiber membrane assembly capable of preventing hollow-fiber membrane filaments from cracking, comprising hollow-fiber membrane filaments 1, protective film(s) 2 and fastening material 3, wherein the protective film 2 enwraps the outside of the hollow-fiber membrane filament(s) 1 near the end head 5, and a portion of the protective film 2 is immobilized in the fastening material 3, while the rest portion of the protective film 2 outside of the fastening material 3 is left free.

In one preferred embodiment of the invention, the protective film 2 sheathes the outside of the hollow-fiber membrane filament(s) 1, and one protective film 2 sheath contains one or more hollow-fiber membrane filaments 1.

In another preferred embodiment of the invention, the inner surface of the protective film 2 sheath is in close contact with the outer surface of the hollow-fiber membrane filament(s) 1, wherein the free end opening of the protective film 2 sheath left outside of the fastening material 3 has a bell-mouthed shape.

In another preferred embodiment of the invention, the section of the protective film 2 sheath has a shape selected from the group consisting of one circle, one triangle, one ellipse, one quadrangle, or any other polygon alone, and more circles, triangles, ellipses, quadrangles, or other polygons in combination.

In another preferred embodiment of the invention, the hollow-fiber membrane filaments 1 in the protective film sheath 2 are formed into a membrane bundle, wherein the end of the membrane bundle is immobilized in the fastening material 3 at the end head 5, and the inner stream passage of the hollow-fiber membrane filament 1 is open at least at one end to allow water in or out.

In another preferred embodiment of the invention, when the ends of more than one membrane bundles are immobilized in the fastening material 3 at the end head 5, the membrane bundles are interconnected, wherein the void formed at the joint has a shape selected from the group consisting of a circle, an ellipse, a triangle and other polygons, and the void formed at the joint is hollow or plugged up with the fastening material. When the void is hollow, it may be used as water or gas passage.

In another preferred embodiment of the invention, the protective film is soft and made up of material selected from plastics, plastic cements, non-woven cloth and the like, such as silica gel, polyvinyl chloride, neoprene, polyethylene, polystyrene, elastic plastics, EPDM rubber and polyurethane. The protective film may be used to enlace the outside of the hollow-fiber membrane filament(s), or it may be formed into a particular shape before it is used to sheathe the outside of the hollow-fiber membrane filament(s). The protective film sheathes the outside of the hollow-fiber membrane filament(s) tightly. Generally, the Shore hardness number of the material is 1-90.

In another preferred embodiment of the invention, the outside of each hollow-fiber membrane filament 1 near the end head 5 is enwrapped with the protective film 2, and there is no void between the protective film 2 and the hollow-fiber membrane filament 1. The upper part of the end head 5 of the hollow-fiber membrane filament 1 and the upper part of the protective film 2 are immobilized in the fastening material 3. The hollow-fiber membrane filaments 1 immobilized in the fastening material 3 are separated from one another by the fastening material 3.

In another preferred embodiment of the invention, two or more hollow-fiber membrane filaments 1 are integrated into a bundle, and the outside of the membrane bundle is enwrapped with the protective film 2. The upper part of the end head 5 of the hollow-fiber membrane filaments 1 and the upper part of the protective film 2 are immobilized in the fastening material 3, and the upper parts of the hollow-fiber membrane filaments 1 immobilized in the fastening material 3 but not enwrapped with the protective film 2 are separated from one another by the fastening material 3.

In another aspect of the invention, there is provided a filter comprising the foregoing hollow-fiber membrane assembly capable of preventing hollow-fiber membrane filaments from cracking.

Further description of the invention will be made with reference to the accompanied drawings. However, it is to be understood that they are only used for the purpose of illustrating the invention without limiting the scope thereof.

FIG. 1 is a sectional view of hollow-fiber membrane filaments enlaced by protective films and then immobilized in fastening material according to one embodiment of the invention. As shown in FIG. 1, the hollow-fiber membrane assembly comprises the hollow-fiber membrane filaments 1, the protective films 2 enlacing the outside of the hollow-fiber membrane filaments 1 near the end head 5, wherein a portion of the protective film 2 is immobilized in the fastening material 3, while the rest portion of the protective film 2 outside of the fastening material 3 is left free, with the end surface 4 of the fastening material being the border of the two portions; there is no void between the protective film 2 and the hollow-fiber membrane filament 1; and the hollow-fiber membrane filaments 1 immobilized in the fastening material 3 are separated from one another by the fastening material 3.

Figure 2:
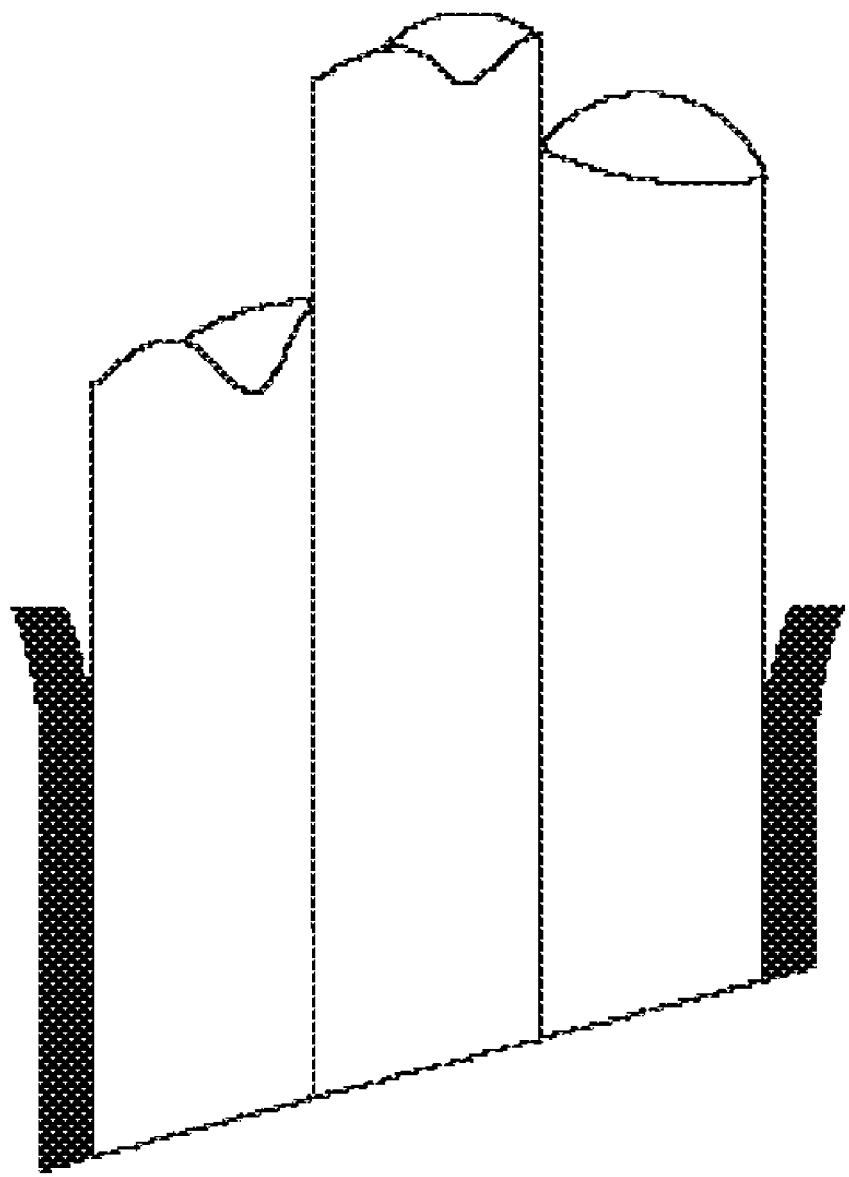
FIG. 2 is a cross-sectional view of a membrane bundle of hollow-fiber membrane filaments enlaced by a protective film according to another embodiment of the invention.

FIG. 2 is a cross-sectional view of a membrane bundle of hollow-fiber membrane filaments enlaced by a protective film according to another embodiment of the invention. As shown in FIG. 2, the inner surface of the protective film is in close contact with the outer surface of the hollow-fiber membrane filaments, wherein the free end opening of the protective film left outside of the fastening material has a bell-mouthed shape.

Figure 3:
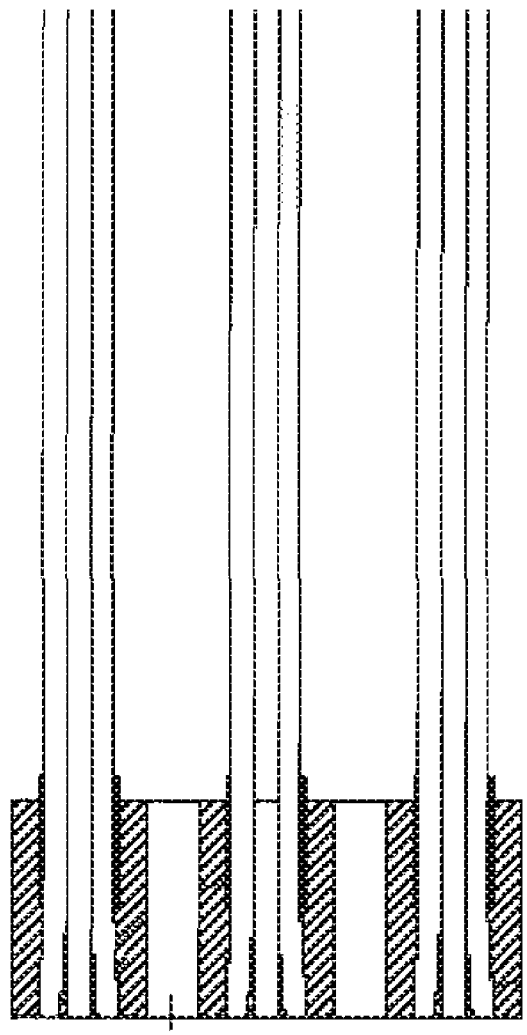
FIG. 3 is a sectional view of interconnected membrane bundles of hollow-fiber membrane filaments wherein the voids formed at the joint of the interconnected bundles are hollow according to another embodiment of the invention.

FIG. 3 is a sectional view of interconnected membrane bundles of hollow-fiber membrane filaments wherein the voids formed at the joint of the interconnected bundles are hollow according to another embodiment of the invention. As shown in FIG. 3, the voids are totally hollow so that they may be used as water or gas passage.

Figure 4:
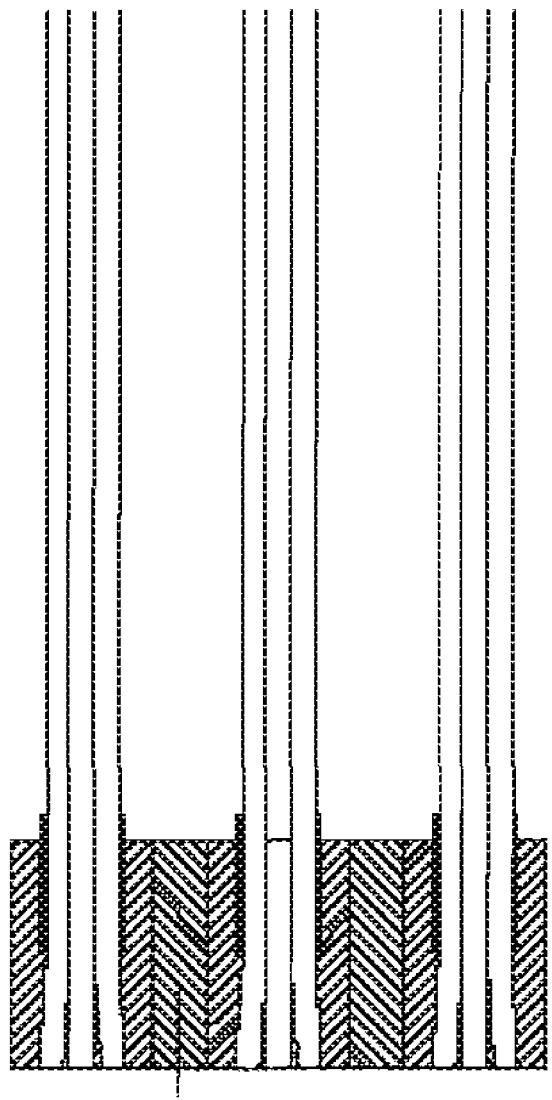
FIG. 4 is a sectional view of interconnected membrane bundles of hollow-fiber membrane filaments wherein the voids formed at the joint of the interconnected bundles are plugged up with fastening material according to another embodiment of the invention.

FIG. 4 is a sectional view of interconnected membrane bundles of hollow-fiber membrane filaments wherein the voids formed at the joint of the interconnected bundles are plugged up with fastening material according to another embodiment of the invention. As shown in FIG. 4, the voids are thoroughly plugged up so that they can not be used as water or gas passage.

The main advantages of the invention include:

The hollow-fiber membrane assembly has a reasonable structure, enhanced utility efficiency of hollow membrane filaments, high filtering efficiency, high throughput of outcoming water, long life and low unit cost, and it is effective in preventing the joint between the hollow-fiber membrane filaments and the fastening material from cracking, so as to enhance the tensile strength of the hollow-fiber membrane filaments to a great extent.

Although the invention has been described in detail for the purpose of clarity and understanding, it will be apparent to those skilled in the art, after reading the specification of this application, that various modifications and changes may be made to the invention without departing from the spirit and nature of the invention. Such modifications and changes are intended to be included in the scope defined by the appended claims and equivalents thereof.

What is claimed is:

1. A hollow-fiber membrane assembly capable of preventing hollow-fiber membrane filaments from cracking, comprising:
    a plurality of hollow-fiber membrane filaments;
    protective film sheaths; and
    a fastening material,
    wherein each hollow-fiber membrane filaments has an outside surface, an inside surface and an end head, the protective film sheaths enwrap the outside of the hollow-fiber membrane filaments near the end head, and a portion of the protective film sheaths are immobilized in the fastening material, wherein an inner surface of the protective film sheaths is in close contact with the outer surface of the hollow-fiber membrane filaments, and a free end opening of the protective film sheaths outside of the fastening material has a bell-mouthed shape which prevents contact between the outer surface of the membrane filaments and the outer surface of the sheaths in the area outside the fastening material.

2. The hollow-fiber membrane assembly of claim 1, wherein each protective film sheath contains one or more hollow-fiber membrane filaments.

3. The hollow-fiber membrane assembly of claim 2, wherein a section of each protective film sheath has a shape selected from the group consisting of one circle, one triangle, one ellipse, one quadrangle, or any other polygon alone, and more circles, triangles, ellipses, quadrangles, or other polygons in combination.

4. The hollow-fiber membrane assembly of claim 3, wherein the hollow-fiber membrane filaments 3 in each protective film sheath is formed into a membrane bundle, the end head of each membrane bundle is immobilized in the fastening material, and an inner stream passage of the hollow-fiber membrane filaments is open at least at one end to allow water in or out.

5. The hollow-fiber membrane assembly of claim 4, wherein when end heads of more than one membrane bundles are immobilized in the fastening material, the membrane bundles are interconnected, the void formed at the joint has a shape selected from the group consisting of a circle, an ellipse, a triangle and other polygons, and the void formed at the joint is hollow or plugged up with the fastening material.

6. The hollow-fiber membrane assembly of claim 2, wherein no void is formed between each protective film sheath and the respective hollow-fiber membrane filaments, the upper part of the end head of the hollow-fiber membrane filaments and the upper part of the protective film sheaths are immobilized in the fastening material, and the hollow-fiber membrane filaments immobilized in the fastening material are separated from one another by the fastening material.

7. The hollow-fiber membrane assembly of claim 1, wherein the protective film sheaths is made of material selected from plastics, plastic cements and non-woven cloth, with a Shore hardness number of the material of 1-90.

8. The hollow-fiber membrane assembly of claim 7, wherein each protective film sheath is made of material selected from silica gel, polyvinyl chloride, neoprene, polyethylene, polystyrene, elastic plastics, EPDM rubber and polyurethane.

9. A filter comprising the hollow-fiber membrane assembly of claim 1.

* * * * *